US008194601B2

United States Patent
Han et al.

(10) Patent No.: US 8,194,601 B2
(45) Date of Patent: Jun. 5, 2012

(54) METHOD FOR TRANSMITTING AND RECEIVING SIGNALS USING MULTI-BAND RADIO FREQUENCIES

(75) Inventors: Seung Hee Han, Anyang-Si (KR); Ki Ho Nam, Anyang-Si (KR); Min Seok Noh, Anyang-si (KR); Jin Sam Kwak, Anyang-Si (KR); Yeong Hyeon Kwon, Anyang-Si (KR); Hyun Woo Lee, Anyang-Si (KR); Dong Cheol Kim, Anyang-Si (KR); Sung Ho Moon, Anyang-Si (KR); Sung Gu Cho, Anyang-Si (KR); Moon Il Lee, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 678 days.

(21) Appl. No.: 12/343,241

(22) Filed: Dec. 23, 2008

(65) Prior Publication Data
US 2009/0175243 A1   Jul. 9, 2009

Related U.S. Application Data (60) Provisional application No. 61/016,496, filed on Dec. 24, 2007.

(30) Foreign Application Priority Data

Mar. 28, 2008  (KR) .................. 10-2008-0029099
Aug. 1, 2008  (KR) .................. 10-2008-0075602

(51) Int. Cl.
*H04W 4/00* (2009.01)
*H04B 7/216* (2006.01)
*H04B 3/46* (2006.01)
*H04K 1/10* (2006.01)

(52) U.S. Cl. ......... 370/329; 370/335; 375/227; 375/260
(58) Field of Classification Search .......... 370/535–542, 370/342–344, 328–335; 375/227–229, 260
See application file for complete search history.

(56) References Cited

U.S. PATENT DOCUMENTS
2002/0147017 A1   10/2002   Li et al.
(Continued)

FOREIGN PATENT DOCUMENTS
EP          1 573 949 A2   9/2005
(Continued)

*Primary Examiner* — Brandon Renner
(74) *Attorney, Agent, or Firm* — Birch, Stewart, Kolasch & Birch, LLP (57) ABSTRACT

A method for transmitting and receiving signals using multi-band Radio Frequencies (RFs) is provided. The method performs channel coding on an information unit of a specific layer above a physical layer to produce a specific number of codewords and maps the generated specific number of codewords to a plurality of frequency allocation bands managed by one specific layer, and then transmits the mapped signal through each of the plurality of frequency allocation bands. Each of the plurality of frequency allocation bands managed by the one specific layer has a band size for allocation for a specific service according to a predetermined frequency policy. When the generated specific number of codewords is mapped to the plurality of frequency allocation bands, each of the specific number of codewords is mapped to at least one of the plurality of frequency allocation bands. A frequency allocation band used for transmission of each codeword when the codeword is retransmitted may be set to be different from that when it is initially transmitted.

8 Claims, 9 Drawing Sheets

U.S. PATENT DOCUMENTS

| | | | |
|---|---|---|---|
| 2004/0052273 A1 | 3/2004 | Karaoguz et al. | |
| 2004/0181569 A1* | 9/2004 | Attar et al. | 709/200 |
| 2005/0245199 A1* | 11/2005 | Batra et al. | 455/73 |
| 2008/0095121 A1* | 4/2008 | Shattil | 370/335 |
| 2008/0144493 A1* | 6/2008 | Yeh | 370/230 |
| 2008/0298450 A1* | 12/2008 | Zhang et al. | 375/227 |
| 2008/0310526 A1* | 12/2008 | Maltsev et al. | 375/260 |
| 2009/0086657 A1* | 4/2009 | Alpert et al. | 370/310 |

FOREIGN PATENT DOCUMENTS

| | | |
|---|---|---|
| RU | 2309551 C2 | 10/2007 |
| WO | WO-2004/028057 A2 | 4/2004 |
| WO | WO 2005/043854 A1 | 5/2005 |
| WO | WO 2006/070996 A1 | 7/2006 |
| WO | WO-2006/104344 A2 | 10/2006 |

* cited by examiner

METHOD FOR TRANSMITTING AND RECEIVING SIGNALS USING MULTI-BAND RADIO FREQUENCIES

CROSS-REFERENCE TO RELATED APPLICATIONS

This application claims the benefit of the U.S. Provisional Application No. 61/016,496, filed on Dec. 24, 2007, which is hereby incorporated by reference as if fully set forth herein.

This application claims the benefit of the Korean Patent Application Nos. 10-2008-0029099 and 10-2008-0075602 filed on Mar. 28, 2008 and Aug. 1, 2008, respectively, which are hereby incorporated by reference as if fully set forth herein.

BACKGROUND OF THE INVENTION

1. Field of the Invention

The present invention relates to a method for transmitting and receiving signals using multi-band Radio Frequencies (RFs) to improve reliability and/or throughput of a communication system that supports multi-band RFs.

2. Discussion of the Related Art

The following description is given mainly focusing on a downlink (DL) mode in which a base station transmits signals to one or more terminals. However, it will be easily understood that the principle of the present invention described below can be directly applied to an uplink (UL) mode simply by reversing the procedure of the DL mode.

A technology in which one MAC entity manages multiple carriers (or frequency allocation bands (or simply "frequency allocations (FAs)")) has been suggested to efficiently use multiple bands or multiple carriers.

Figure 1:
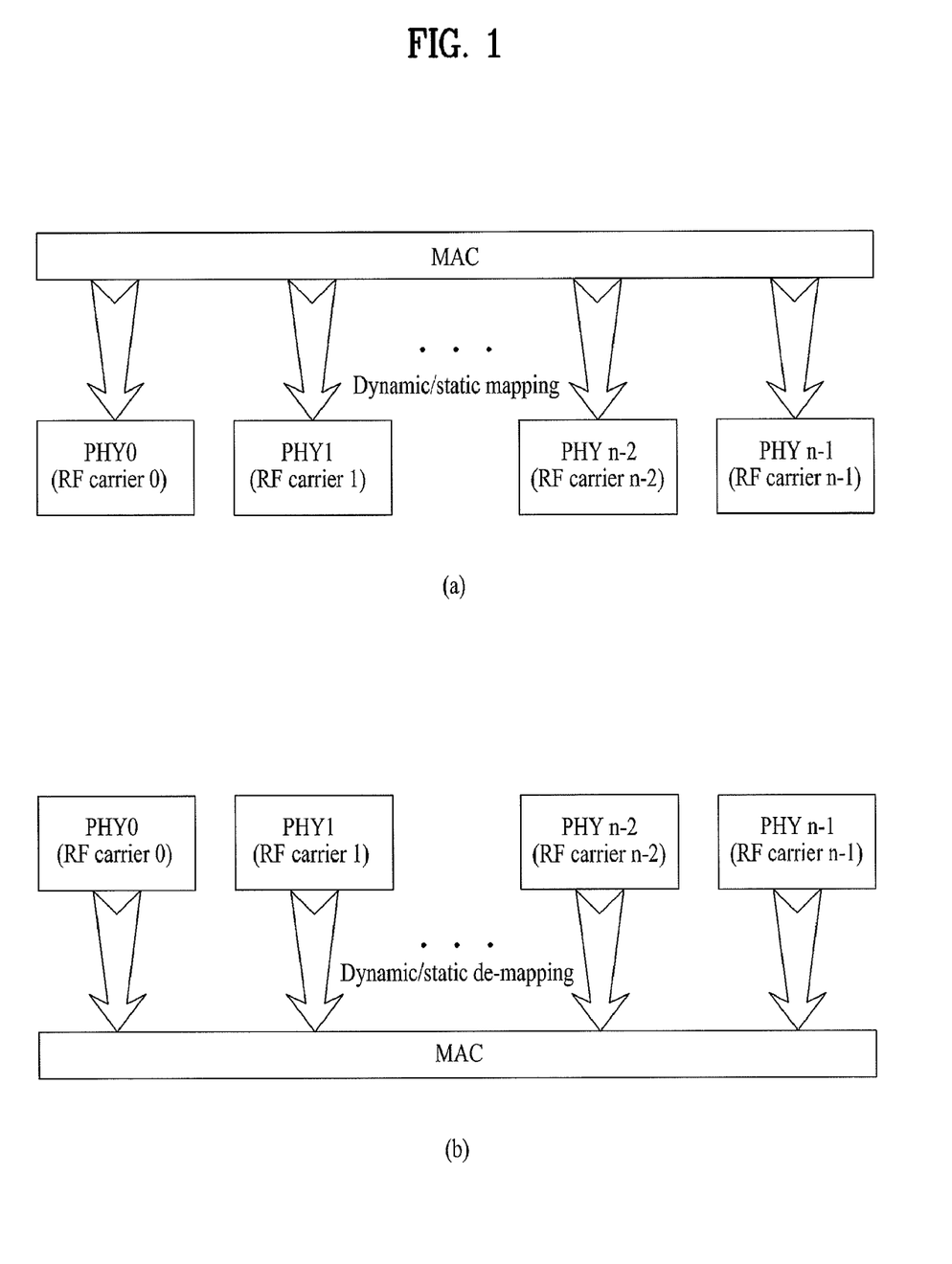
FIGS. 1A and 1B schematically illustrate a method for transmitting and receiving signals using multi-band RFs.

FIGS. 1A and 1B schematically illustrate a method for transmitting and receiving signals using multi-band RFs.

In FIGS. 1A and 1B, PHY0, PHY1, ... PHY n-2, and PHY n-1 represent multiple bands according to this technology and each of the bands may have a Frequency Allocation (FA) size allocated for a specific service according to a predetermined frequency policy. For example, the band PHY0 (RF carrier 0) may have a band size allocated for a general FM radio broadcast and the band PHY1 (RF carrier 1) may have a band size allocated for mobile phone communication. Although each frequency band may have a different band size depending on the characteristics of the frequency band, it is assumed in the following description that each Frequency Allocation band (FA) has a size of A MHz for ease of explanation. Each FA can be represented by a carrier frequency that enables a baseband signal to be used in each frequency band. Thus, in the following description, each frequency allocation band will be referred to as a "carrier frequency band" or will simply be referred to as a "carrier" as it may represent the carrier frequency band unless such use causes confusion. As in the recent 3GPP LTE-A, the carrier is also referred to as a "component carrier" for discriminating it from a subcarrier used in the multicarrier system.

From this aspect, the "multi-band" scheme can also be referred to as a "multicarrier" scheme or "carrier aggregation" scheme.

In order to transmit signals through multiple bands as shown in FIG. 1A and to receive signals through multiple bands as shown in FIG. 1B, both the transmitter and the receiver need to include an RF module for transmitting and receiving signals through multiple bands. In FIGS. 1A and 1B, the method of configuring a "MAC" is determined by the base station, regardless of the DL or UL mode.

Simply stated, the multi-band scheme is a technology in which one MAC entity, which will simply be referred to as a "MAC" unless such use causes confusion, manages and operates a plurality of RF carriers to transmit and receive signals. RF carriers managed by one MAC do not need to be contiguous. Accordingly, this technology has an advantage of high flexibility in management of resources.

For example, frequencies may be used in the following manner.

Figure 2:
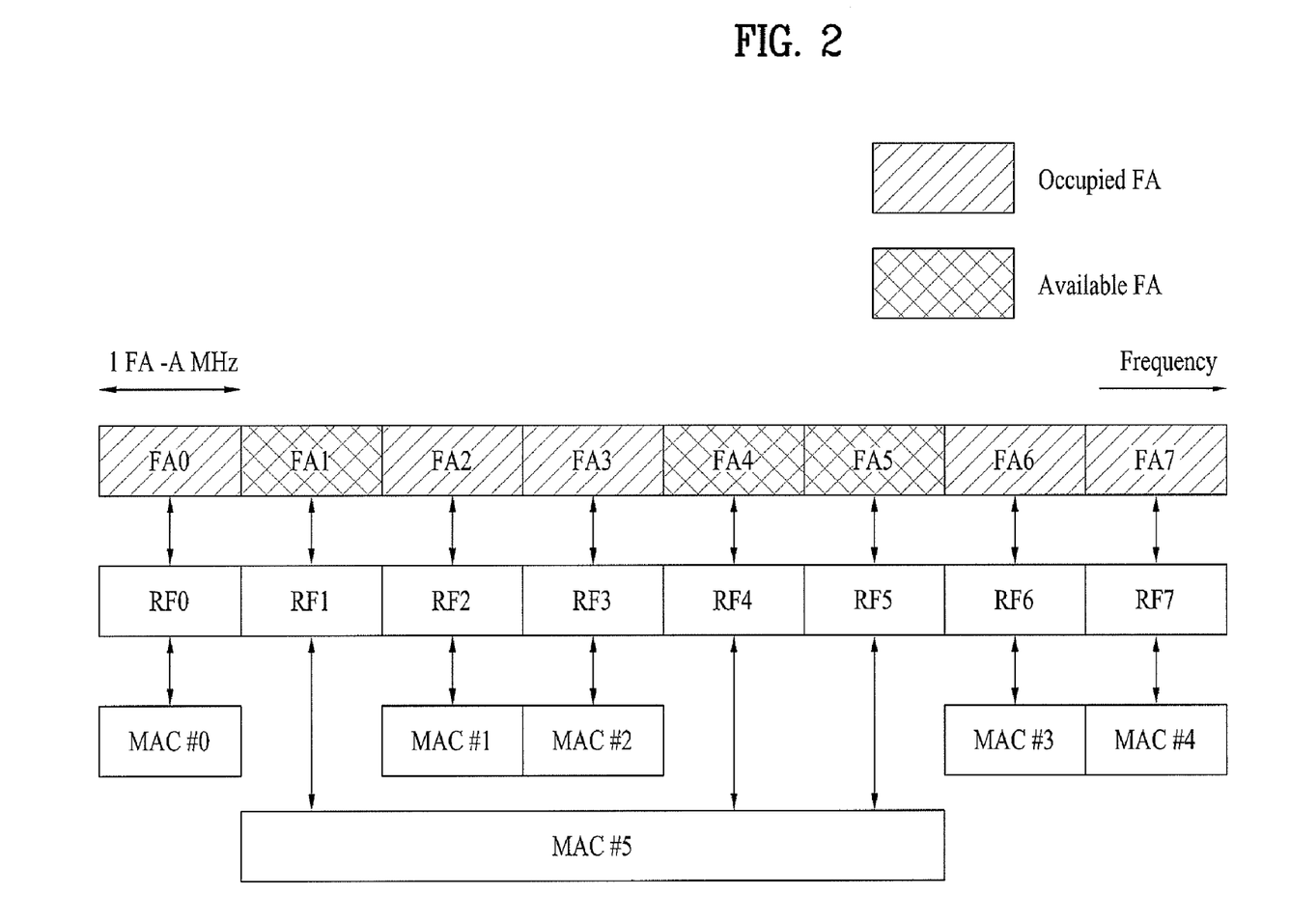
FIG. 2 illustrates an example wherein frequencies are allocated in a multi-band-based communication scheme.

FIG. 2 illustrates an example wherein frequencies are allocated in a multi-band-based communication scheme.

In FIG. 2, bands FA0 to FA7 can be managed based on RF carriers RF0 to RF7. In the example of FIG. 2, it is assumed that the bands FA0, FA2, FA3, FA6, and FA7 have already been allocated to specific existing communication services. It is also assumed that RF1 (FA1), RF4 (FA4), and RF5 (FA5) can be efficiently managed by one MAC (MAC #5). Here, since the RF carriers managed by the MAC need not be contiguous as described above, it is possible to more efficiently manage frequency resources.

In the case of downlink, the concept of the multi-band-based scheme or carrier-aggregation-based scheme described above can be exemplified by the following base station/terminal scenario.

Figure 3:
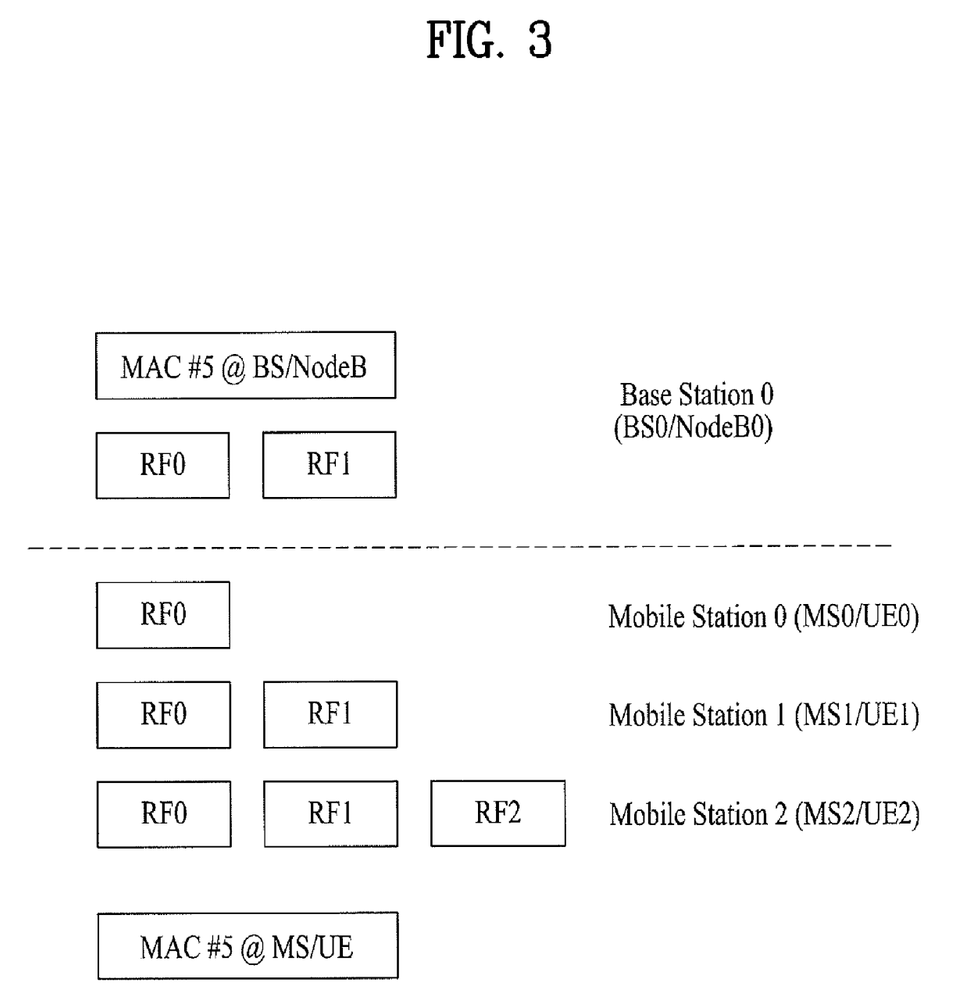
FIG. 3 illustrates an example scenario in which one base station communicates with a plurality of terminals (UEs or MSs) in a multi-band-based scheme.

FIG. 3 illustrates an example scenario in which one base station communicates with a plurality of terminals (UEs or MSs) in a multi-band-based scheme.

In FIG. 3, it is assumed that terminals 0, 1, and 2 have been multiplexed. The base station 0 transmits signals through frequency bands managed by carriers RF0 and RF1. It is also assumed that the terminal 0 is capable of receiving only the carrier RF0, the terminal 1 is capable of receiving both the carriers RF0 and RF1, and the terminal 0 is capable of receiving all the carriers RF0, RF1, and RF2.

Here, the terminal 2 receives signals of only the carriers RF0 and RF1 since the base station transmits only the carriers RF0 and RF1.

However, the above multi-band-based communication scheme has only been conceptually defined and can be regarded simply as a scheme in which an additional frequency allocation band (FA) is allocated when needed. Thus, there is a need to define, in more detail, a signal transmission/reception scheme or a multiplexing method that enables high-efficient and high-performance processing.

In addition, there is a need to study a technology for more efficiently improving reception performance when an HARQ scheme is applied to the multi-band-based communication scheme.

Since channel coding or multiplexing is generally performed for each frequency band in the above technology, the diversity or multiplexing gain may be limited.

SUMMARY OF THE INVENTION

An object of the present invention devised to solve the problem lies on providing a method for obtaining an additional diversity gain and/or multiplexing gain when signals are transmitted and received in a multi-band-based communication system.

Another object of the present invention devised to solve the problem lies on providing a method for combining a multi-band-based signal transmission scheme with a Maximal Ratio Combining (MRC) or MIMO technology to improve reliability of signal reception.

In accordance with an embodiment of the present invention, the above and other objects can be achieved by providing a method for transmitting signals, the method including performing channel coding on an information unit of a specific layer above a physical layer to produce a specific number of codewords, mapping the generated specific number of codewords to a plurality of frequency allocation bands managed by an entity corresponding to the specific layer, and transmitting the mapped signal through each of the plurality of frequency allocation bands, wherein each of the plurality of frequency allocation bands managed by the single entity has a band size for allocation for a specific service according to a predetermined frequency policy, and wherein, when the generated specific number of codewords are mapped to the plurality of frequency allocation bands, each of the specific number of codewords is mapped to at least one of the plurality of frequency allocation bands.

Here, the step of performing channel coding on an information unit of the specific layer may include multiplexing the information unit of the specific layer.

This embodiment may be used in combination with a scheme in which the plurality of frequency allocation bands managed by the entity is grouped into at least one group and an identical signal is transmitted through each of the at least one group or a scheme in which each of the plurality of frequency allocation bands managed by the entity is regarded as a single eigenchannel matrix to transmit a signal.

In accordance with another embodiment of the present invention, the above and other objects can be achieved by providing a method for receiving signals, the method comprising receiving a signal through each of a plurality of frequency allocation bands managed by an entity corresponding to a specific layer above a physical layer, and demapping the received signal into a specific number of codewords to perform channel decoding on the specific number of codewords, wherein each of the plurality of frequency allocation bands managed by the entity has a band size for allocation for a specific service according to a predetermined frequency policy, and wherein, when the received signal is demapped into the specific number of codewords, each of the specific number of codewords is obtained through demapping of a signal received through at least one of the plurality of frequency allocation bands.

Here, the step of demapping the received signal may include demultiplexing the received signal into an information unit of the specific layer.

The method may further include grouping the plurality of frequency allocation bands managed by the entity into at least one group and combining signals received through the at least one group through Maximal Ratio Combining (MRC).

The method may also further include performing multi-channel processing on a signal received through each of the plurality of frequency allocation bands while regarding each of the plurality of frequency allocation bands managed by the entity as a single eigenchannel matrix.

In the above embodiments, the specific band may be a Media Access Control (MAC) layer.

In accordance with another embodiment of the present invention, the above and other objects can be achieved by providing a method for receiving signals, the method including receiving a signal through each of a plurality of frequency allocation bands managed by one entity corresponding to a specific layer above a physical layer, and grouping the plurality of frequency allocation bands managed by the entity into at least one group and combining signals received through the at least one group through Maximal Ratio Combining (MRC), wherein each of the plurality of frequency allocation bands managed by the entity has a band size for allocation for a specific service according to a predetermined frequency policy.

In accordance with another embodiment of the present invention, the above and other objects can be achieved by providing a method for receiving signals, the method including receiving a signal through each of a plurality of frequency allocation bands managed by one entity corresponding to a specific layer above a physical layer, and performing multi-channel processing on a signal received through each of the plurality of frequency allocation bands while regarding each of the plurality of frequency allocation bands managed by the entity as a single eigenchannel matrix, wherein each of the plurality of frequency allocation bands managed by the entity has a band size for allocation for a specific service according to a predetermined frequency policy.

According to each of the embodiments of the present invention described above, it is possible to obtain an additional diversity gain and/or multiplexing gain when signals are transmitted and received in a multi-band-based communication system and also to combine a multi-band-based signal transmission scheme with a Maximal Ratio Combining (MRC) or MIMO technology, thereby improving reliability of signal reception.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

The present invention suggests a transmission/reception method in which one MAC that manages a plurality of RF carriers efficiently processes signals to improve reliability and throughput of the system. The present invention can also be applied to a method in which one terminal or user equipment (UE) flexibly uses a plurality of MACs that employs the multi-carrier-based scheme in combination with the general communication scheme in a hybrid manner.

In the following description, the term "Media Access Control (MAC) layer" is used as a general term describing a layer (for example, a network layer) above the Physical (PHY) layer (Layer 1) among the 7 OSI layers, which is not necessarily limited to the MAC layer. In addition, the "MAC" according to the present invention is used as a concept including not only a MAC in the IEEE system but also a MAC present for each frequency band in the 3GPP system.

Although the following description has been given with reference to an example where multi-band RFs are contiguous, the multiple bands according to the present invention do not necessarily include physically contiguous RF carriers. In addition, although the bandwidth of each RF carrier is described below as being equal for ease of explanation, the present invention may also be applied to the case where the bandwidths of frequency bands managed based on each RF carrier are different. For example, an RF frequency band (RF0) of 5 MHz and an RF frequency band (RF1) of 10 MHz may be managed by one MAC entity.

In addition, although RF carriers in the present invention may be those of the same system, the RF carriers may also be those to which different Radio Access Technologies (RATs) are applied. For example, we can consider an example wherein the 3GPP LTE technology is applied to RF0 and RF1, the IEEE 802.16m technology is applied to RF2, and the GSM technology is applied to RF3.

Reference will now be made to embodiments in which channel coding and multiplexing are integrally specified in a communication system that uses multiple frequency bands to obtain a diversity gain and/or a multiplexing gain.

Methods of Mapping Codewords to Multiple Frequency Bands

A method for mapping codewords produced through channel coding to RF carriers according to an embodiment of the present invention will now be described with reference to FIG. 4.

Figure 4:
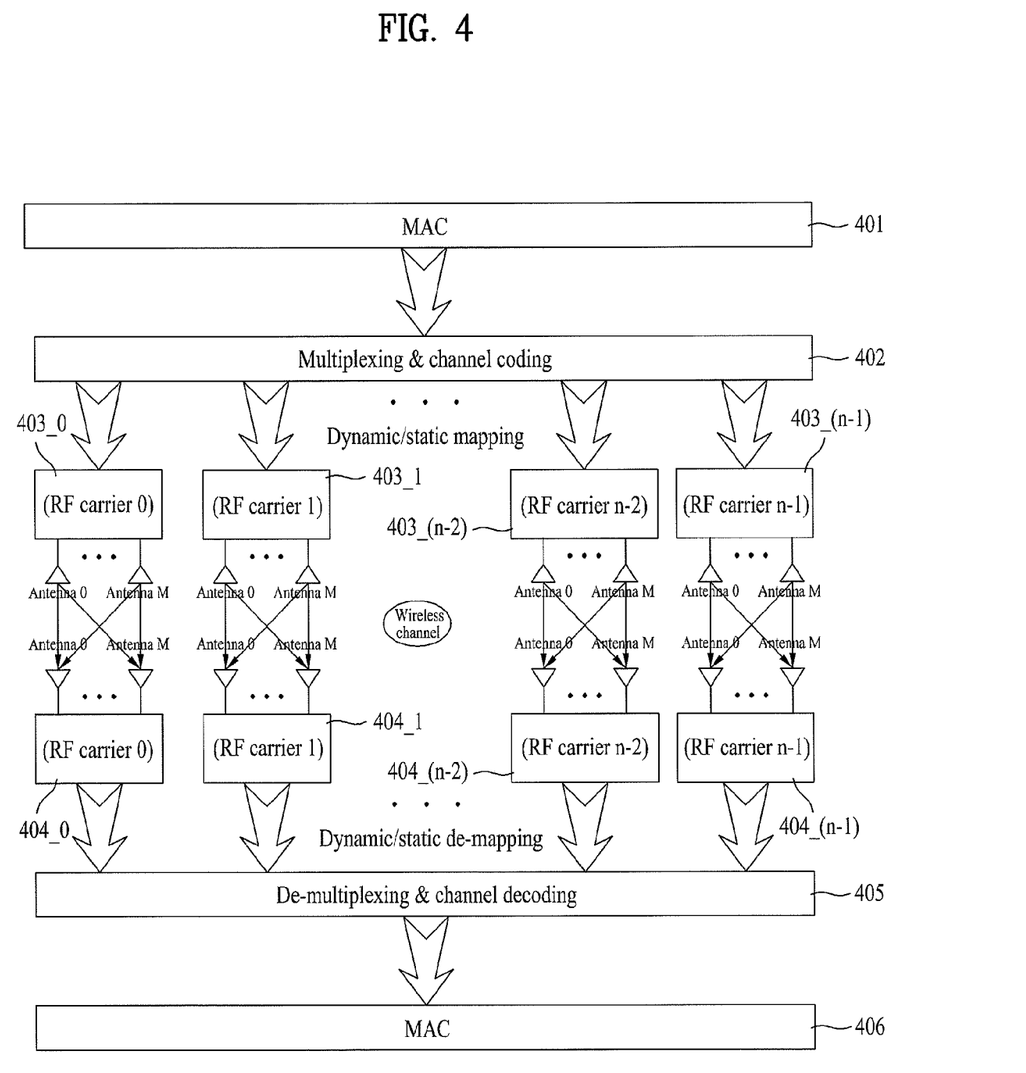
FIG. 4 illustrates the concept that codewords produced through multiplexing/channel coding according to an embodiment of the present invention are mapped to a plurality of frequency bands to perform signal transmission and reception according to an embodiment of the present invention.

FIG. 4 illustrates the concept that codewords produced through multiplexing/channel coding according to an embodiment of the present invention are mapped to a plurality of frequency bands to perform signal transmission and reception according to an embodiment of the present invention.

Although, in FIG. 4, antennas are illustrated as being individually present for each RF carrier for ease of explanation, antennas are not necessarily provided individually for each RF carrier in this embodiment. That is, antennas illustrated in FIG. 4 can be shared between RF carriers.

Specifically, although in FIG. 4 two transmit antennas and two receive antennas are illustrated as being provided for each RF carrier such that a total of 2n transmit antennas and a total of 2n receive antennas are provided for n RF carriers, this arrangement of antennas is only a conceptual illustration. In an actual system, an RF module function such as signal amplification is individually used for each of the n carrier bands and a total of two transmit/receive antennas are commonly used by all carrier bands.

On the other hand, one main feature of the signal transmission and reception method of this embodiment, different from the conventional method, is that a multiplexing chain 402 is defined independently of frequency bands that are managed according to respective RF carriers to achieve a diversity gain among carriers. Thus, in FIG. 4, the multiplexing & channel coding block 402 is illustrated separately from processing of each RF carrier. That is, in this embodiment, one MAC PDU 401 is subjected to channel coding and/or multiplexing on the basis of a unit defined separately from the plurality of frequency bands (402) and a codeword(s) produced through this process can be mapped to each of one or more frequency allocation bands 403_0 to 403_(n-1). In this manner, it is possible to efficiently achieve a diversity gain, compared to the method in which a channel coding and multiplexing scheme is specified for each frequency allocation band, and to achieve an additional diversity gain depending on the number of frequency bands to which one codeword is mapped.

In this embodiment, a portion for modulating bits mapped to each frequency band according to PSK or QAM can be defined in any of the multiplexing & channel coding module 402 or the RF carrier blocks 403_0 to 403(n-1). However, illustration of the modulation portion is omitted from the conceptual diagram of FIG. 4. Although a bit (or symbol) interleaver may be added as needed, illustration thereof is omitted from FIG. 4 since it is not directly associated with the main concept of this embodiment.

Mapping of channel-coded bits to each RF carrier according to an embodiment of the present invention can be divided into mapping of segments of a single codeword (SCW) to a plurality of RF carriers (SCW mapping method) and mapping of segments of a group of multiple codewords (MCW) to each RF carrier (MCW mapping method).

The term "SCW mapping method" in this embodiment refers to a method in which a plurality of information to be transmitted through RF carriers managed by one MAC is channel-coded and modulated to produce one codeword and the codeword is then mapped to each RF carrier. The term "MCW mapping method" in this embodiment refers to a method in which a plurality of information to be mapped to one or more RF carriers among RF carriers managed by one MAC is channel-coded in mapping units to produce codewords and each codeword is then mapped to an RF carrier(s). Here, the MCW mapping includes not only mapping of one codeword to one RF carrier and mapping of one codeword to x RF carriers (x: natural number greater than 1).

The following is a brief description of mapping of information of a MAC PDU (for example, packet) to a codeword in this embodiment.

The term "MAC" used in the description of the present invention is a general term describing a portion that enables upper-layer processing and includes a plurality of MAC PDU components. For example, mapping of MAC packets to codewords can be divided into three schemes: 1) a first (one to one mapping) scheme in which one MAC packet is mapped to one codeword, 2) a second (multiple to one mapping) scheme in which one or more MAC packets (i.e., a packet aggregation) are mapped to one codeword, and 3) a third (one to multiple mapping) scheme in which one MAC packet is segmented and mapped to a plurality of codewords. The following are advantages of each of the three schemes.

When the first scheme is employed, MAC packets are generally divided on a user basis and therefore it is easy to achieve optimization through adaptive processing or AMC on a codeword basis for each user. For example, according to this scheme, different Modulation and Coding Schemes (MCSs) can be applied to a first carrier and a second carrier to perform link adaptation.

When the second scheme is employed, one or more mapping packets may be combined at the MAC and may then be transmitted to the PHY or may also be combined at the PHY. Combining mapping packets can achieve an advantage of overhead reduction since a MAC header is generally attached to each MAC packet. This scheme may also have an advantage of increasing the coding gain since multiple mapping packets are combined to perform channel coding.

When the third scheme is employed, there is an advantage in that a different HARQ modulation order, coding rate, or the like can be applied to each codeword.

Figure 5:
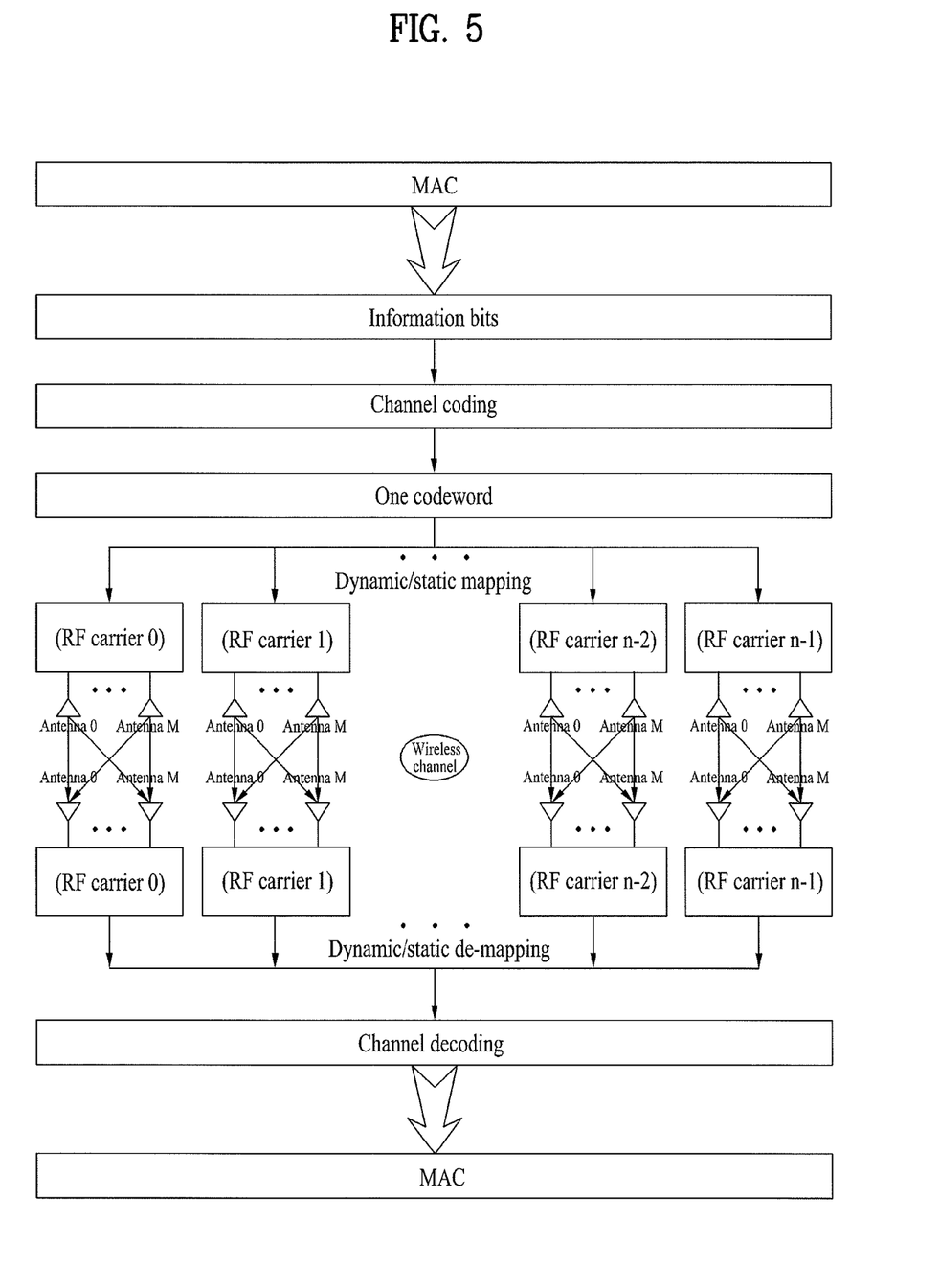
FIG. 5 illustrates an example method in which a codeword is mapped to an RF carrier according to the SCW scheme among the schemes used in the embodiment.

FIG. 5 illustrates an example method in which a codeword is mapped to an RF carrier according to the SCW scheme among the schemes used in this embodiment.

Figure 6:
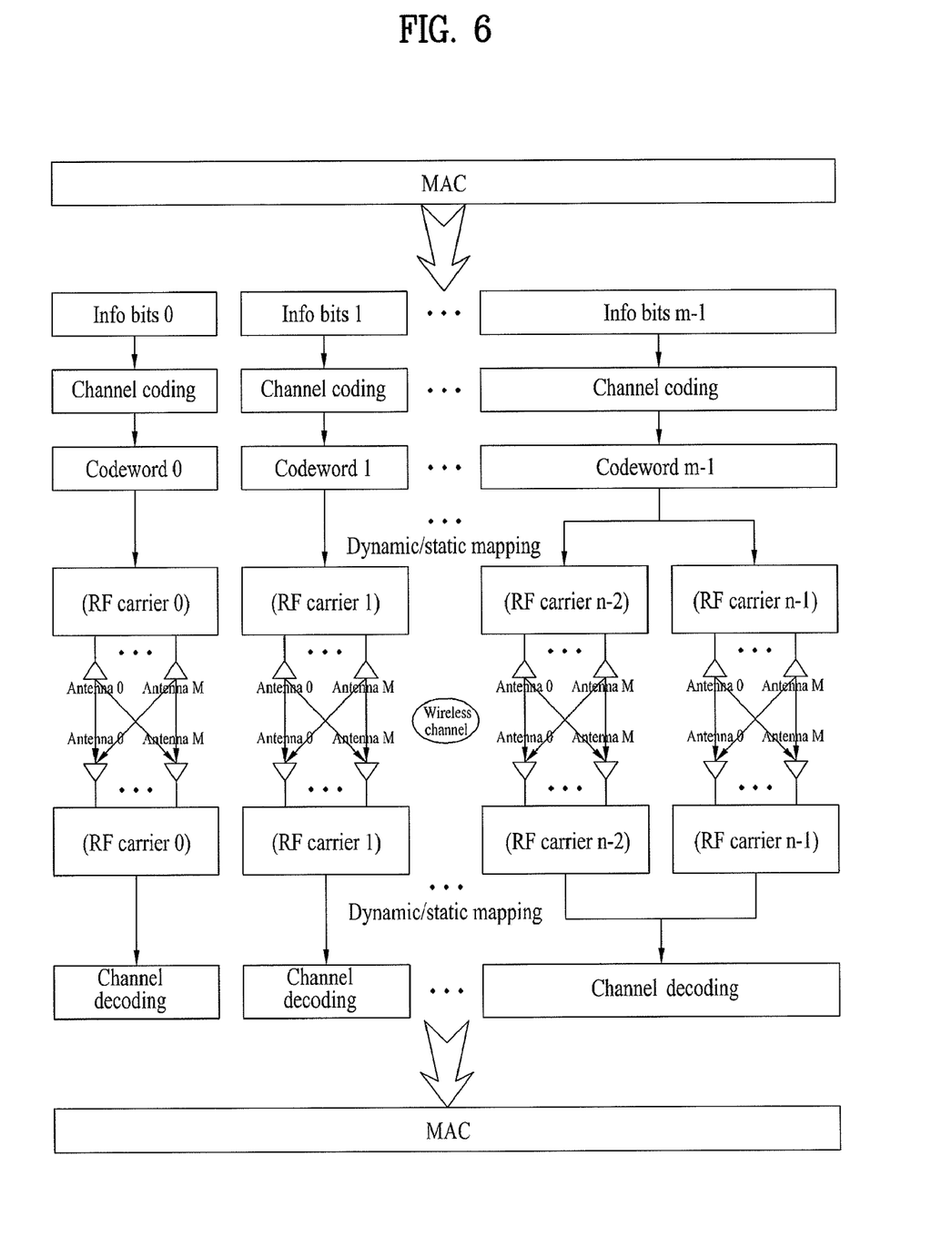
FIG. 6 illustrates an example method in which a codeword is mapped to an RF carrier according to the MCW scheme among the schemes used in the embodiment.

FIG. 6 illustrates an example method in which a codeword is mapped to an RF carrier according to the MCW scheme among the schemes used in this embodiment.

Similar to the method of FIG. 4, PSK or QAM modulation may be performed at any portion before or after the RF carrier block in the methods of FIGS. 5 and 6 and illustration of the corresponding modulation portion is omitted from the conceptual diagram of FIGS. 5 and 6.

When one codeword is mapped to a plurality of frequency allocation bands according to the SCW scheme as shown in FIG. 5, it is possible to obtain an additional diversity gain compared to when channel coding is performed for each frequency allocation band. When the MCW scheme is used as shown in FIG. 6, one codeword is not necessarily mapped to one frequency allocation band as in the conventional method but instead the RF carrier mapping unit may be flexibly set such that one codeword (codeword m-1) is mapped to two RF carriers (RF carrier n-2 and RF carrier n-1). This achieves both the advantage of reducing the overhead and the advantage of increasing the diversity gain.

When the HARQ scheme is applied, at least one codeword may be grouped and cyclic transmission may be performed in each group in order to obtain a diversity gain. The following is a brief description of cyclic transmission.

Let us assume that a total of 4 RF carriers RF0, RF1, RF2, and RF3 are present and 4 codewords C0, C1, C2, and C3 are transmitted respectively through the 4 RF carriers RF0, RF1, RF2, and RF3 in initial transmission. In the case where 1st retransmission is performed upon receiving a NACK, the codewords C0, C1, C2, and C3 may be cyclically shifted by one codeword (for example, using a modulo operation) so that the codewords C3, C0, C1, and C2 are transmitted respectively through the 4 RF carriers RF0, RF1, RF2, and RF3. In the case where 2nd retransmission is performed upon receiving a NACK again, the codewords C3, C0, C1, and C2 may again be cyclically shifted by one codeword so that the codewords C2, C3, C0, and C1 are transmitted respectively through the 4 RF carriers RF0, RF1, RF2, and RF3.

In the case where this embodiment is applied to a system with 2 RF carriers and 2 codewords, the above method may be construed as swapping the codewords every retransmission. That is, the above method may be considered as changing transmission positions of the codewords every retransmission in such a manner that the codewords C0 and C1 are transmitted through the RF carriers RF0 and RF1, respectively, at 1st retransmission and the codewords C1 and C0 are then transmitted through the RF carriers RF0 and RF1, respectively, at 2nd retransmission.

In another embodiment of the present invention, RF carrier hopping may be performed for each codeword in the time domain every codeword transmission. For example, when codewords C0, C1, C2, and C3 are transmitted for 4 RF carriers at time t0, codewords C1, C3, C2, and C0 may be transmitted at next time t1.

The hopping pattern used in this embodiment may be defined according to the PN code such as a gold code or an m-sequence and may also be set using various other methods. One example hopping pattern setting method other than the PN-code-based method is to apply cyclic hopping every codeword transmission. In this method, cyclic shift is applied to codeword transmission positions every transmission, unlike the above method in which cyclic hopping is applied every codeword transmission. That is, cyclic hopping may be repeatedly applied in such a manner that codewords C0, C1, C2, and C3 are transmitted at time t0, codewords C3, C0, C1, and C2 are transmitted at time t1, and codewords C2, C3, C0, and C1 are transmitted at time t2.

Although the above description has been given with reference to an example wherein the mapping position at which each codeword produced by performing channel coding on an information unit (for example, a transport block of the 3GPP system) of a specific layer (for example, MAC) is mapped to each RF carrier is changed every retransmission or every transmission, a method in which the mapping position at which each transmission block is mapped to each RF carrier is changed every retransmission or every transmission may be considered identical to the above method. In the case where an information unit (information bits) (for example, a transport block) of the specific layer is in a one to one relationship with each code block and RF carriers as in FIG. 6, the method of changing the mapping position of an information unit (for example, a transport block) of the specific layer is changed every transmission (or retransmission), the method of changing the mapping positions of codewords every transmission (or retransmission), and the method of changing RF carriers used for transmission every transmission (or retransmission) may be considered identical.

Figure 7:
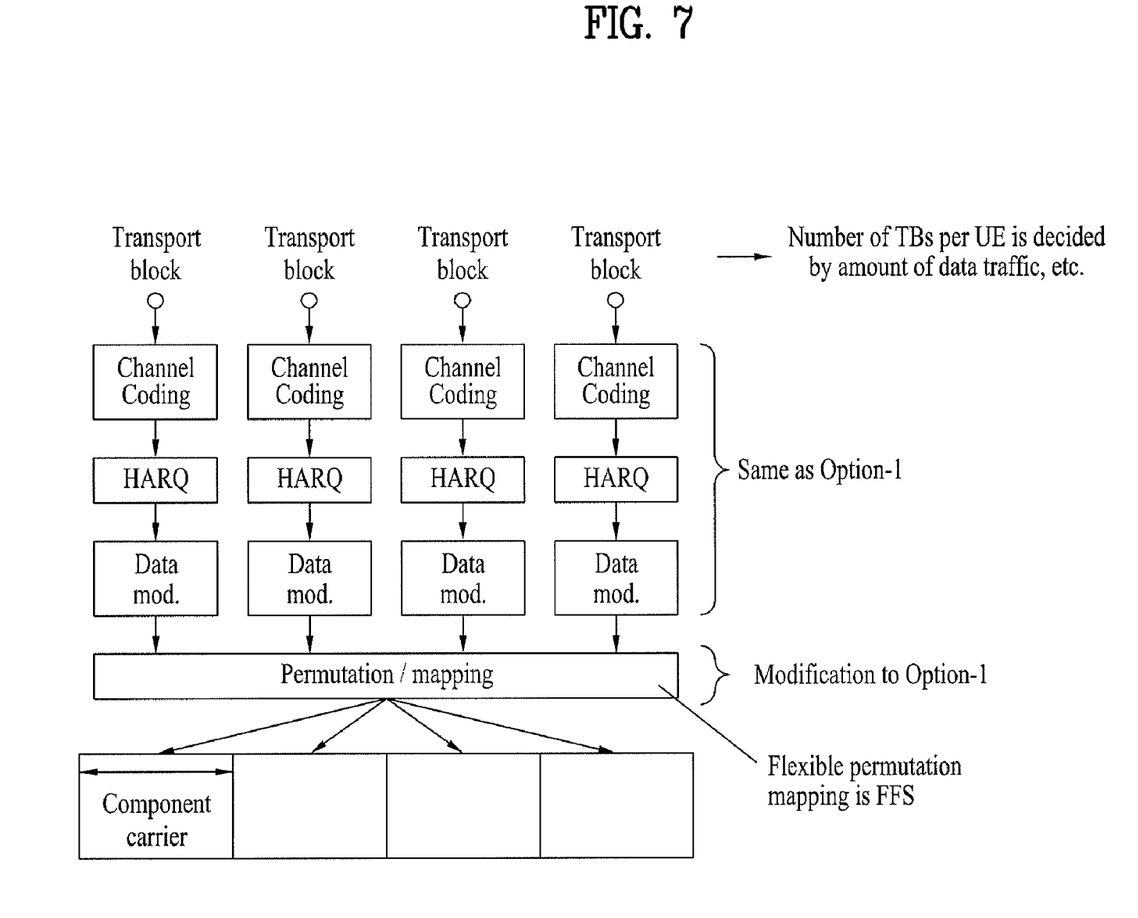
FIG. 7 conceptually illustrates a transmission method in which signals are transmitted using multiple carriers in a specific system.

FIG. 7 conceptually illustrates a transmission method in which signals are transmitted using multiple carriers in a specific system.

The method in which the mapping position of each information unit is changed or an RF carrier used for transmission is changed every transmission (or retransmission) as described above can be directly applied to link adaptation or HARQ in the system that uses the transmission method shown in FIG. 7.

Specifically, when the HARQ method is applied, the position of mapping of a transport block to each channel coding block may be changed every retransmission in the method of FIG. 7. In addition, the position of mapping of a transport block to each RF carrier (component carrier) after the transport block passes through a permutation/mapping module may be changed every retransmission.

When link adaptation is applied, a different MCS may be applied to each transport block in the method of FIG. 7 or, similarly, a different MCS may be applied to each RF carrier (component carrier) after the transport block passes through the permutation/mapping module.

Method of Obtaining Inter-Carrier Cooperative Diversity

This embodiment suggests a method in which an inter-carrier cooperative diversity technique is applied to the multi-band communication scheme described above. The term "cooperative diversity technique" refers to a diversity technique that is applied to UEs which use the same frequencies (i.e., UEs which share resources).

For example, it is assumed in the following description that a base station transmits information to a user equipment (UE) in a downlink mode through a relay station that has been established as an intermediate station between the base station and the UE. The relay station receives and processes a signal destined for the UE and then transmits the processed signal to the UE. Here, the UE can obtain a diversity gain by combining the signal received from the base station and the information received from the relay station. When one UE A transmits information to the base station in an uplink mode, another UE B may receive and process information from the UE A and transmits the processed information to the base station. In this case, the base station can obtain a diversity gain for the information of the UE A by processing the two signals received from the UE A and the UE B.

However, these technologies involve the cooperative technique applied to UEs that share resources (for example, frequencies) and the cooperative diversity acquisition method described above has not been defined for a multi-carrier-based mode in which UEs use different resources (frequencies or carriers).

Although the MIMO scheme in which one or more (multiple) antennas are used in each frequency band has not been described above since the MIMO scheme is not directly associated with the subject of the present invention, the above method of the present invention can be used in combination with any existing MIMO scheme.

The concept of this embodiment can be used in combination not only with the technologies described above but also with the method of performing channel coding and multiplexing regardless of the frequency allocation unit according to an embodiment of the present invention. Accordingly, the following description will be given, mainly focusing on the RF carrier block part with reference to the conceptual diagrams of FIGS. 4 to 6 for ease of explanation.

This embodiment suggests the following two main methods.

In the first method, which is a cooperative diversity acquisition method according to an embodiment of the present invention, signals received through a plurality of frequency allocation bands are combined according to a Maximal Ratio Combining (MRC) scheme to obtain a diversity gain. The following is a more detailed description of this method with reference to FIG. 8.

Figure 8:
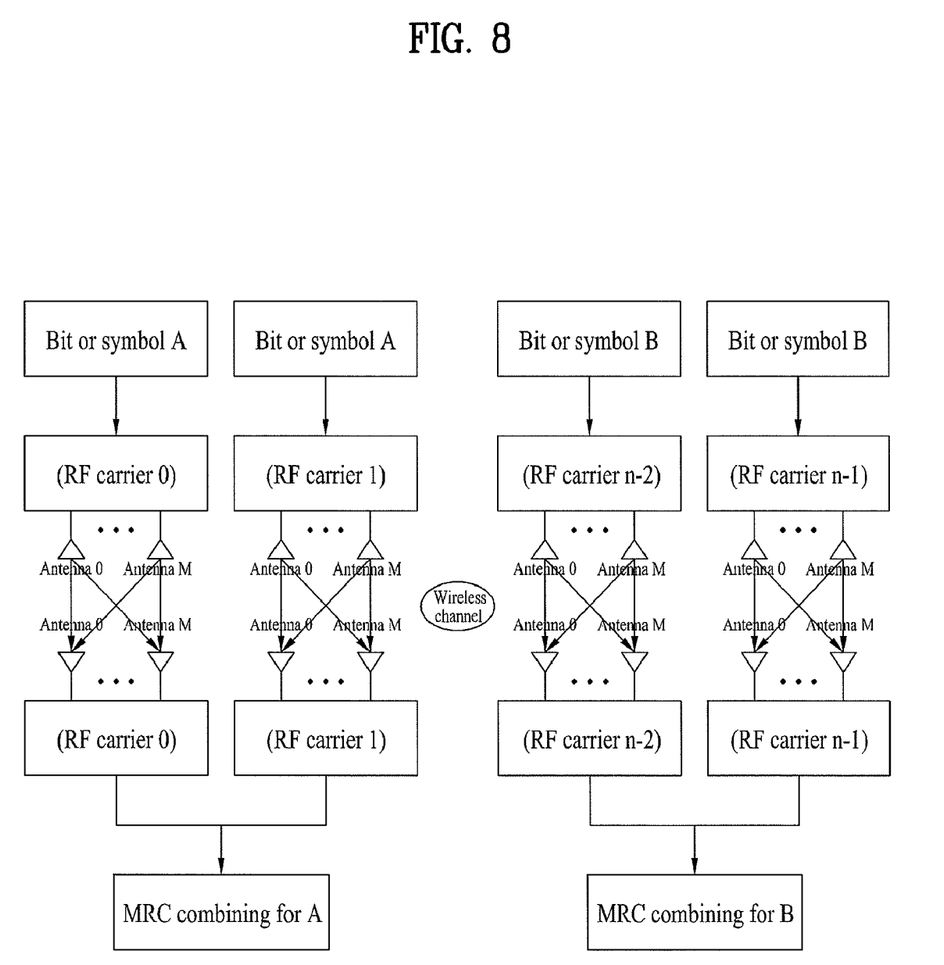
FIG. 8 illustrates a method in which signals received through a plurality of frequency allocation bands are combined using the MRC scheme to obtain a diversity gain according to an embodiment of the present invention.

FIG. 8 illustrates a method in which signals received through a plurality of frequency allocation bands are combined using the MRC scheme to obtain a diversity gain according to an embodiment of the present invention.

According to this embodiment, a bit (or symbol) A is repeated twice to be transmitted through an RF carrier 0 and an RF carrier 1 and a bit (or symbol) B is repeated twice to be transmitted through an RF carrier n-2 and an RF carrier n-1 as shown in FIG. 8. When signals that have been transmitted through frequency allocation bands represented by respective RF carriers in this manner are received, the received signals are MRC-combined for each group of frequency allocation bands that have been grouped according to a predetermined scheme. In the example illustrated in FIG. 8, signals received through the RF carrier 0 and the RF carrier 1 are combined through the same MRC combination module A and signals received through the RF carrier n-2 and the RF carrier n-1 are combined through another MRC combination module B.

Here, the Maximal Ratio Combining (MRC) scheme is a wireless communication technology in which signals received through a plurality of channels are combined using a variety of respective proportional constants for the channels. The MRC scheme provides optimal combination of signals received under different wireless channel environments. In the MRC scheme, the transmitting side transmits the same signal through a plurality of frequency allocation bands grouped in specific grouping units and the receiving side combines signals received through the plurality of frequency allocation bands according to the MRC scheme, thereby obtaining an additional inter-carrier diversity gain. This diversity gain is an additional one that is obtained separately from the diversity gain obtained through the conventional MIMO scheme used in each frequency allocation band.

The following is a brief description of MRC for better understanding.

The following description is given focusing on the RF carriers 0 and 1 in FIG. 8. If the same signal s is transmitted through the RF carriers 0 and 1, signals $r_0$ and $r_1$ received through the RF carriers 0 and 1 can be represented by the following equations.

$$r_0 = sh_0 + n_0 \rightarrow \text{RF carrier 0}$$

$$r_1 = sh_1 + n_1 \rightarrow \text{RF carrier 1} \quad \text{[MATHEMATICAL EXPRESSION 1]}$$

Here, "h" represents a wireless channel response and "n" represents AWGN.

When the received signals $r_0$ and $r_1$ are MRC-combined, the resulting signal is represented by the following equation.

$$\begin{aligned} r &= r_0 h_0^* + r_1 h_1^* \quad \text{[MATHEMATICAL EXPRESSION 2]} \\ &= (sh_0 + n_0)h_0^* + (sh_1 + n_1)h_1^* \\ &= s(|h_0|^2 + |h_1|^2) + n_0 h_0^* + n_1 h_1^* \end{aligned}$$

Here, since $r_0 h_0^* + r_1 h_1^*$ is again regarded as AWGN due to statistical characteristics, the receiving side obtains a gain of $|h_0|^2 + |h_1|^2$.

When the transmitting side transmits a signal through multiple carrier bands according to the embodiment described above, the transmitting side can select the carrier bands for transmission of the signal using CQI, PMI, rank information, or the like fed back from the receiving side. This enables improvement of overall system efficiency.

The following is a description of a method for transmitting and receiving signals according to an inter-carrier Multi-Input Multi-Output (MIMO) scheme.

Although the MIMO scheme generally indicates an inter-antenna processing scheme, it is assumed in this embodiment that the MIMO scheme includes an inter-RF-carrier processing scheme. The MIMO processing according to this embodiment is performed by applying the conventional single carrier MIMO processing schemes to RF carriers while regarding a channel generated for each RF carrier as a single virtual eigenchannel matrix.

In this embodiment, one eigenchannel matrix can be defined as a channel matrix generated when the MIMO scheme is applied to one RF.

Figure 9:
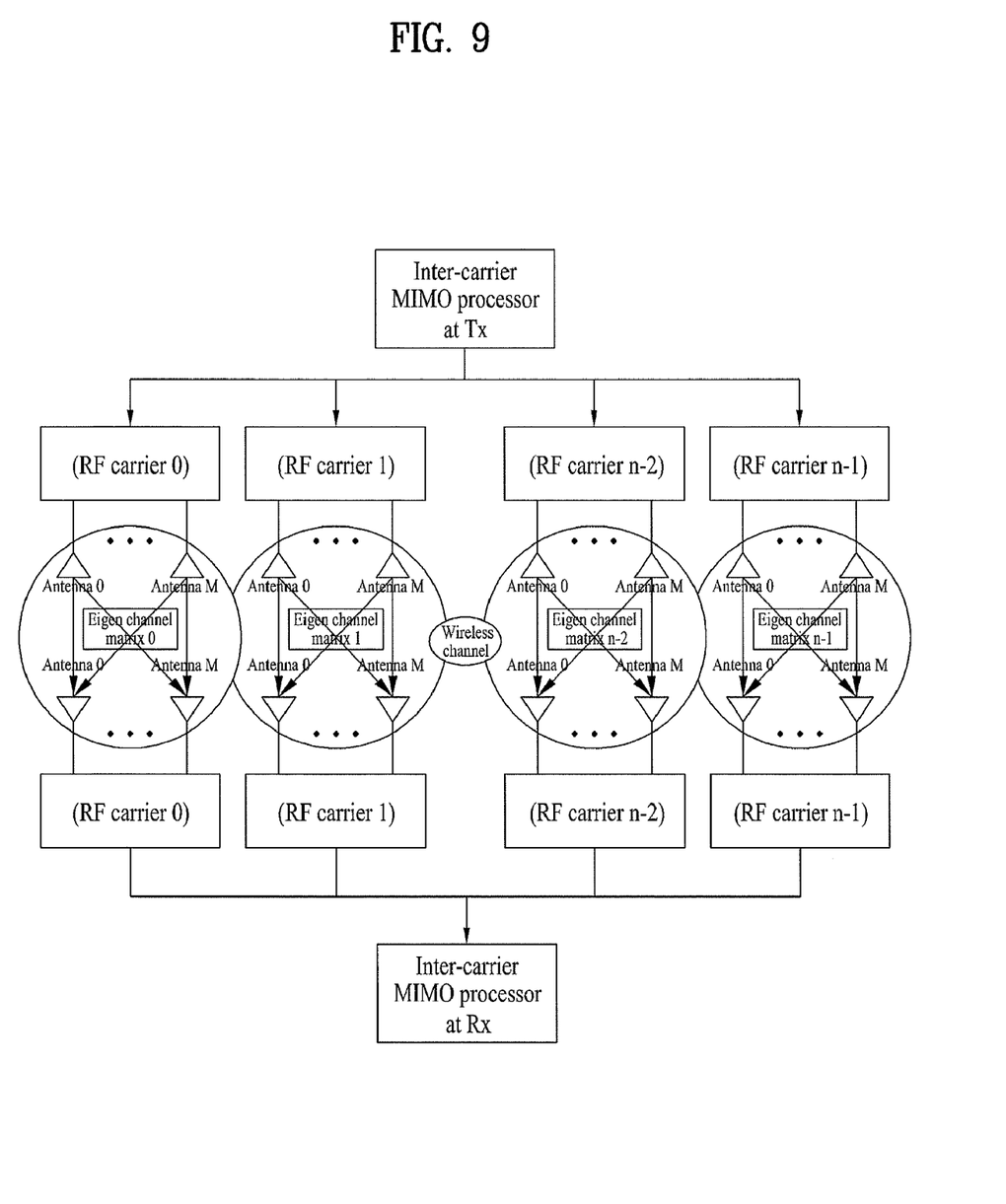
FIG. 9 conceptually illustrates a method in which each of the multiple frequency allocation bands is applied as an eigenchannel matrix to implement an inter-frequency-band multi-antenna transmission scheme.

FIG. 9 conceptually illustrates a method in which each of the multiple frequency allocation bands is applied as an eigenchannel matrix to implement an inter-frequency-band multi-antenna transmission scheme.

In the example illustrated in FIG. 9, one virtual eigenchannel matrix is generated from one RF carrier. However, the scope of this embodiment also includes a method in which one virtual eigenchannel matrix is generated from a plurality of RF carriers and a method in which a plurality of virtual eigenchannel matrices is generated from a plurality of RF carriers. In addition, the MIMO processing in a frequency band may be performed in units of virtual eigenchannel matrices and may also be performed in units of antenna branches in a virtual eigenchannel matrix.

It should also be noted that the inter-carrier MIMO scheme can also be used in combination with the inter-antenna MIMO scheme in a specific RF carrier in the example illustrated in FIG. 9. In addition, a conventional inter-antenna MIMO scheme such as an inter-carrier selection scheme or an inter-carrier virtual eigen-beamforming scheme can be extended and applied as the inter-carrier (i.e., inter-frequency-allocation-band) MIMO processing scheme.

In one example of the inter-carrier selection scheme, an inter-carrier MIMO processor may select and transmit M RF carriers (M: arbitrary variable number) in decreasing order of the ranks of respective RF carrier frequencies, highest rank first, or may select M RF carriers in decreasing order of the Precoding Matrix Indices (PMI) of respective RF carrier frequencies, highest PMI first. Alternatively, the inter-carrier MIMO processor may select M RF carriers while sequentially switching the RF carriers according to transmission time. Here, since each RF carrier forms an eigenchannel for its carrier position, the case where M=1 is identical to the case where the inter-carrier virtual eigen-beamforming scheme is applied. The case where M is equal to the maximum number of RF carriers in the MAC is identical to the case where signals are transmitted through all carriers without carrier switching. The above scheme may be used in combination with the conventional mapping scheme in each RF carrier. The above processes may be adaptively applied every time.

In addition, when a base station transmits N RF carriers, Adaptive Modulation and Coding (AMC) or power allocation, which is used to control power, may be performed within given power according to channel states of N RF carriers since total power of the base station is limited.

The following is a description of a detailed example of the method for performing channel selection as described above.

The conventional multi-antenna scheme as shown in FIG. 8 can be used for each RF carrier frequency band in the multi-carrier-based system. In this example, it is assumed that both selection of channels from carrier bands and selection of channels from a carrier band are used for the eigenchannel-based channel selection. Here, channel selection from carrier bands indicates an inter-carrier-band MIMO scheme and channel selection from a carrier band indicates the inter-antenna MIMO scheme. Here, eigenchannel selection may be performed using a variety of methods which are mainly divided into 1) a method in which an RF carrier band is selected through average channel quality and an eigenchannel is then selected from the selected RF carrier band and 2) a method in which possible eigenchannels are selected from a total of RF carrier bands in decreasing order of channel quality.

Information associated with the inter-carrier-band MIMO mode described above may be provided through a broadcast channel or a control channel. A channel information feedback such as a carrier band index preferred by the UE or CQI of each carrier band may be fed back through the corresponding carrier band or alternatively feedback information of a plurality of carrier bands may be grouped to be fed back in a single unit.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The signal transmission/reception method according to each of the above embodiments of the present invention can be widely used for a multi-carrier system in which one MAC entity manages a plurality of carrier frequency bands as described above. That is, the signal transmission/reception method according to each of the above embodiments of the present invention can be applied to any system, regardless of whether it is a 3GPP LTE system, a 3GPP LTE-A system, or an IEEE 802.16m system, provided that the system is applied as a multi-carrier system as described above.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting signals using a plurality of frequency allocation bands, each having a band size for allocation, the plurality of frequency allocation bands being managed by one specific layer above a physical layer, the method comprising:

mapping a plurality of information units of the specific layer to a plurality of channel coding blocks, respectively;

performing channel coding on the plurality of information units of the specific layer through the plurality of mapped channel coding blocks to produce a plurality of codewords;

mapping the plurality of codewords to the plurality of frequency allocation bands;

transmitting the plurality of codewords through the plurality of frequency allocation bands to which the plurality of codewords are mapped, wherein each of the plurality of codewords is mapped to at least one of the plurality of frequency allocation bands, and wherein the step of mapping the plurality of information units to the plurality of channel coding blocks includes mapping a first information unit and a second information unit to a first channel coding block producing a first codeword and a second channel coding block producing a second codeword, respectively; and re-mapping the first information unit to the second channel coding block when the first information unit is retransmitted.

2. The method according to claim 1, further comprising:
receiving channel quality information of each of the plurality frequency allocation bands through a corresponding frequency allocation band.

3. The method according to claim 2, wherein the plurality of frequency allocations bands through which the plurality of codewords are transmitted are selected based on the channel quality information.

4. The method according to claim 2, wherein the plurality of codewords mapped to the plurality of frequency allocation bands are cyclically shifted by one codeword to be mapped to the plurality of frequency allocation bands when the first codeword is transmitted.

5. The method according to claim 4, wherein the step of performing channel coding includes multiplexing the plurality of information units of the specific layer.

6. The method according to claim 4,
wherein the plurality of frequency allocation bands managed by the one specific layer are grouped into one or more groups, and
wherein the step of transmitting transmits an identical signal through frequency allocation bands of a same group.

7. The method according to claim 4, wherein a channel generated for one of the plurality of frequency allocation bands managed by the one specific layer is regarded as a single eigenchannel matrix to transmit a signal.

8. The method according to claim 4, wherein the step of performing channel coding applies a modulation coding scheme per frequency allocation band.

* * * * *